(12) United States Patent
Long

(10) Patent No.: US 8,590,415 B2
(45) Date of Patent: Nov. 26, 2013

(54) ROBOTIC ARM ASSEMBLY

(75) Inventor: Bo Long, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 299 days.

(21) Appl. No.: 13/149,845

(22) Filed: May 31, 2011

(65) Prior Publication Data

US 2012/0034022 A1 Feb. 9, 2012

(30) Foreign Application Priority Data

Aug. 5, 2010 (CN) .......................... 2010 1 0246202

(51) Int. Cl.
*B25J 17/00* (2006.01)
(52) U.S. Cl.
USPC .......... 74/490.05; 74/490.06; 901/23; 901/26
(58) Field of Classification Search
USPC ............... 74/490.01, 490.02, 490.03, 490.04, 74/490.05, 490.06; 901/21, 2, 15, 19, 23, 901/26
See application file for complete search history.

(56) References Cited

U.S. PATENT DOCUMENTS

| | | | | |
|---|---|---|---|---|
| 5,207,114 A | * | 5/1993 | Salisbury et al. | ........... 74/479.01 |
| 5,305,653 A | * | 4/1994 | Ohtani et al. | ............. 74/490.03 |
| 7,331,750 B2 | * | 2/2008 | Merz et al. | .................... 414/735 |
| 7,513,173 B2 | * | 4/2009 | Ono | ........................... 74/490.03 |
| 7,806,020 B2 | * | 10/2010 | Forslund et al. | ........... 74/490.06 |
| 2005/0049126 A1 | * | 3/2005 | Everson et al. | ................. 483/47 |
| 2008/0034920 A1 | | 2/2008 | Inoue | |
| 2009/0131235 A1 | * | 5/2009 | Katsuno et al. | ................. 483/18 |
| 2012/0067150 A1 | * | 3/2012 | Zhang | ............................ 74/423 |
| 2012/0103127 A1 | * | 5/2012 | Liu | ............................ 74/490.06 |
| 2012/0215356 A1 | * | 8/2012 | Igarashi et al. | ............... 700/258 |
| 2012/0266720 A1 | * | 10/2012 | Oka et al. | ..................... 74/665 H |
| 2012/0321427 A1 | * | 12/2012 | Todorov | ..................... 414/744.3 |
| 2013/0118288 A1 | * | 5/2013 | Liu | ............................ 74/490.04 |

FOREIGN PATENT DOCUMENTS

| | | |
|---|---|---|
| CN | 1744971 A | 3/2006 |
| CN | 101130247 A | 2/2008 |
| CN | 101745918 A | 6/2010 |
| EP | 0167632 A1 | 1/1986 |
| JP | 2005-96073 A | 4/2005 |
| KR | 100405808 B1 | 3/2004 |

\* cited by examiner

*Primary Examiner* — David M Fenstermacher
(74) *Attorney, Agent, or Firm* — Altis & Wispro Law Group, Inc.

(57) ABSTRACT

A robotic arm assembly includes a first segment, a second segment, a first driving device, a first transmission mechanism, a second driving device, and a second transmission mechanism. The second segment is rotatably connected to the first segment. The first driving device drives the second segment to rotate about a first axis relative to the first segment via the first transmission mechanism. The second transmission mechanism includes a first bevel gear and a second bevel gear meshed with the first bevel gear. An output shaft is fixed to the second bevel gear, and the output shaft is capable of rotating about a second axis. Each of the second segment, the output shaft, and the second bevel gear defines a guiding hole, and the guiding holes are aligned in the second axis.

12 Claims, 2 Drawing Sheets

ROBOTIC ARM ASSEMBLY

BACKGROUND

1. Technical Field

The present disclosure relates generally to robots and, more particularly, to a robotic arm assembly.

2. Description of Related Art

Many robotic arms include a fixed base, a frame pivotably connected about a first rotation axis, a first segment, one end of which is pivotably connected to the frame about a second rotation axis, and a second segment, one end of which is pivotably connected to the other end of the first segment about a third rotation axis. An actuator, such as a detector, a welding device, a gripper or a cutting tool, is mounted at a distal end of the second segment of the industrial robotic to execute specific tasks. Generally, six axes are utilized to achieve maximum movement of the actuator.

In robots of this kind, each arm rotates around a rotation axis driven by a driving unit. Typically, the driving unit includes a motor mounted on the first segment and a speed reducer coupled to the motor to transmit the movement of the motor to the second segment. Many cables and conduits are used to connect the motor to an electrical source, the detector to a processor, and the cutting tool to cutting fluids.

When various parts of the robotic arm rotate, the cables and conduit my become entangled with each other and with the moving parts.

Therefore, there is room for improvement within the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
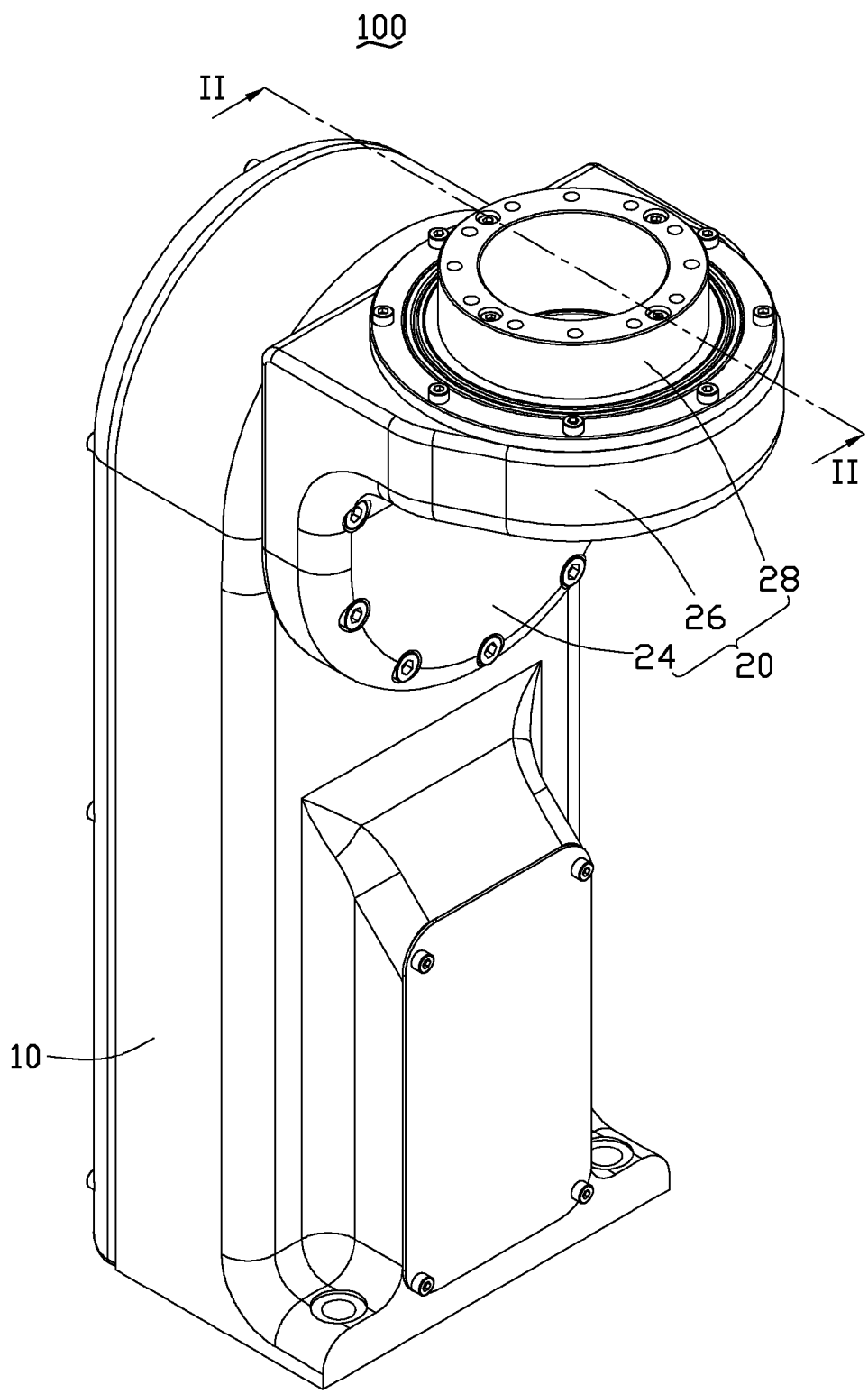
FIG. 1 is an assembled, isometric view of an embodiment of a robotic arm assembly.
Figure 2:
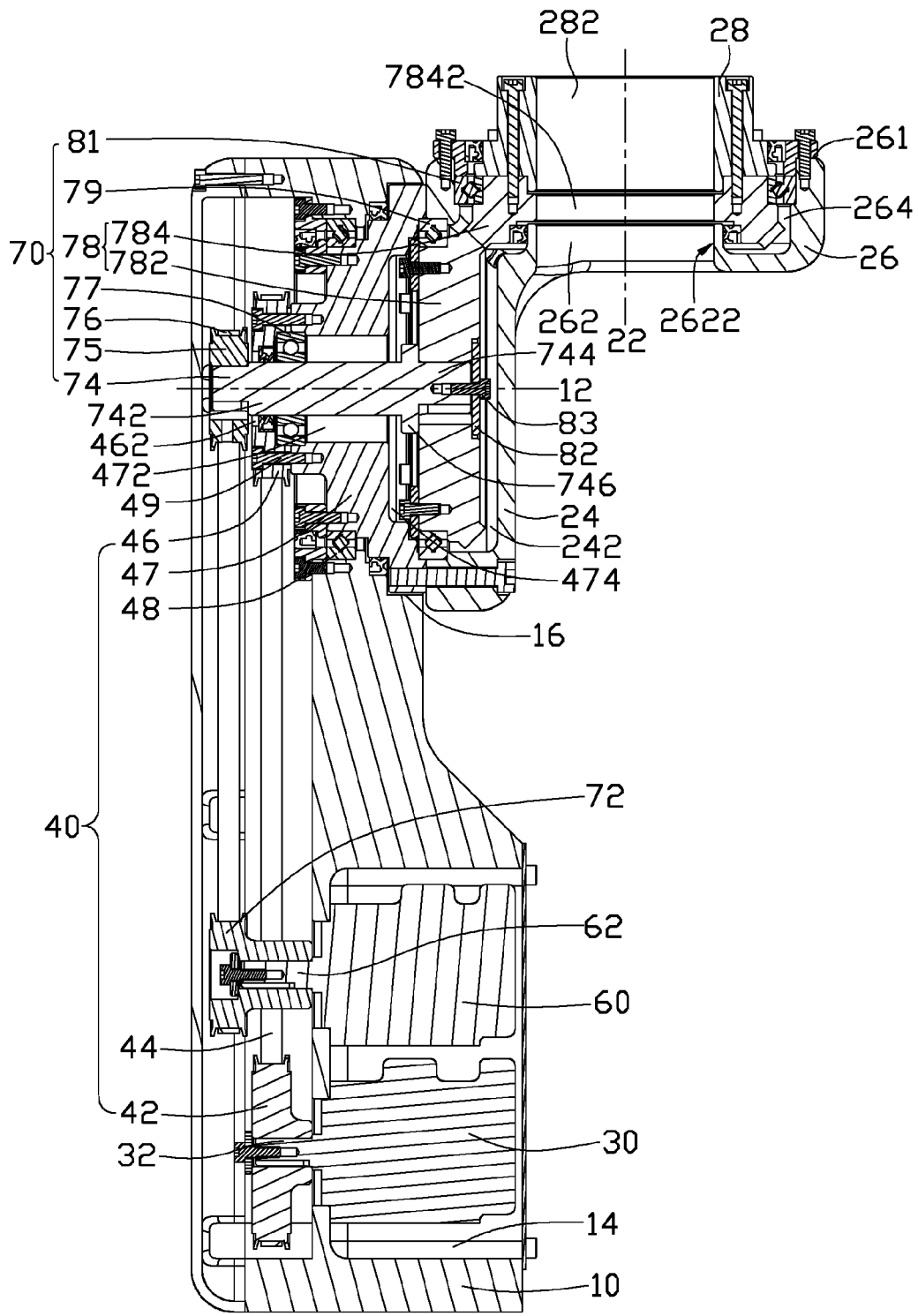
FIG. 2 is a cross-sectional view of the robotic arm assembly, taken along the line II-II.

Referring to FIGS. 1 and 2, an embodiment of a robotic arm assembly 100 includes a first segment 10, a second segment 20, a first driving device 30, a first transmission mechanism 40, a second driving device 60, and a second transmission mechanism 70. The first segment 10 has a first axis 12, and the second segment 20 has a second axis 22 substantially perpendicular to the first axis 12. The second segment 20 is rotatably connected to the first segment 10.

The first segment 10 is substantially a hollow cylinder, and includes a receiving portion 14 and a connecting portion 16 formed on an end of the receiving portion 14. The receiving portion 14 is configured to receive the first driving device 30, the first transmission mechanism 40, the second driving device 60, and the second transmission mechanism 70. The connecting portion 16 is connected to the second segment 20.

The second segment 20 is substantially L-shaped, and includes a fixing portion 24, an output portion 26, and an output shaft 28. The fixing portion 24 is fixed to the connecting portion 16 of the first segment 10. The fixing portion 24 extends along a direction substantially perpendicular to the first axis 12, and defines a receiving groove 242 opposite to the first segment 10. The output portion 26 extends along a direction substantially perpendicular to the second axis 22, and forms an end surface 261. The output portion 26 defines a guiding hole 262 along the second axis 22. A positioning groove 264 is defined in an inner wall 2622 of the guiding hole 262, and communicates with the guiding hole 262. The output shaft 28 is substantially cylindrical, and defines a guiding hole 282. The guiding hole 282 is aligned with the guiding hole 262 along the second axis 22, and communicates with the guiding hole 262.

The first driving device 30 is received in an end of the receiving portion 14 away from the connecting portion 16, and has a driving shaft 32. In the illustrated embodiment, the first driving device 30 is an electrical motor.

The first transmission mechanism 40 includes a first drive wheel 42, a first transmission belt 44, an first action wheel 46, a connecting member 47, and a bearing 48.

The first drive wheel 42 is fixed on the driving shaft 32. The first transmission belt 44 is sleeved on the first drive wheel 42 and the first action wheel 46. The connecting member 47 is received in an end of the receiving portion 14 adjacent to the connecting portion 16, and supported by the bearing 48 that is positioned in the receiving portion 14. The first action wheel 46 is fixed to an end of the connecting member 47 away from the connecting portion 16 via a screw 49. The first action wheel 46 defines a pivot hole 462 aligned in the first axis 12, and the connecting member 47 defines a pivot hole 472 aligned in the first axis 12. The pivot hole 462 communicates with the pivot hole 472. An end of the connecting member 47 adjacent to the connecting portion 16 is fixed to the fixing portion 24 of the second segment 20. The connecting member 47 defines a connecting groove 474 opposite to the fixing portion 24.

The second driving device 60 is received in an end of the receiving portion 14 away from the connecting portion 16, and arranged with the first driving device 30 side by side. The second driving device 60 has a rotation shaft 62. In the illustrated embodiment, the second driving device 60 is an electrical motor.

The second transmission mechanism 70 includes a second drive wheel 72, a transmission shaft 74, a second action wheel 75, a second transmission belt 76, a cross roller bearing 77, a pair of bevel gears 78, a first bearing 79, and a second bearing 81.

The second drive wheel 72 is fixedly sleeved on the rotation shaft 62. The transmission shaft 74 forms a transmission end 742 and a fixing end 744 on opposite ends. The fixing end 744 forms a shaft shoulder 746. The fixing end 744 extends through the pivot hole 472 of the connecting member 47 and the pivot hole 462 of the first action wheel 46, and the transmission end 742 protrudes from the first action wheel 46. The second action wheel 75 is fixedly sleeved on the transmission end 742. The second transmission belt 76 is sleeved on the second drive wheel 72 and the second action wheel 75. The cross roller bearing 77 is sleeved on the transmission end 742, and received in the pivot hole 462 of the first action wheel 46 and the pivot hole 472 of the connecting member 47, thereby supporting the transmission shaft 74. The fixing end 744 is received in the receiving groove 242 of the fixing portion 24.

In the illustrated embodiment, the pair of bevel gears 78 includes a first bevel gear 782 and a second bevel gear 784 meshed with each other. The first bevel gear 782 is non-rotatably sleeved on the fixing end 744 of the transmission shaft 74. An end of the first bevel gear 782 resists the shaft shoulder 746, and the other end of the first bevel gear 782 resists a restricting member 82. The restricting member 82 is fixed to the transmission shaft 74 via a screw 83. The first bevel gear 782 is received in the receiving groove 242 of the fixing portion 24, and supported by the first bearing 79 received in the receiving groove 242. The second bevel gear 784 is received in the positioning groove 264 of the output portion 26, and supported by the second bearing 81 received in the positioning groove 264. The second bevel gear 784 defines a guiding hole 7842 along the second axis 22. The output shaft 28 is fixed to the second bevel gear 784, and can be rotated together with the second bevel gear 784. The guiding holes 262, 282, and 7842 are aligned in the second axis 22.

The robotic arm assembly 100 further includes a plurality of oil seals (not shown), to prevent the bearing 48, the cross roller bearing 77, the first bearing 79, the second bearing 81 and the pair of bevel gears 78 from leaking lubricating oil, and furthermore, avoid external fluid from entering in the robotic arm assembly 100.

In use, a spraying tool (not shown) is fixed to the output shaft 28, by partially inserting it into the guiding hole 282. A plurality of pipes connected to the spraying tool extend through the guiding hole 262 and the guiding hole 7842. The first driving device 30 drives the first drive wheel 42 to rotate, and the first action wheel 46 is driven to rotate by the first drive wheel 42 via the first transmission belt 44. The connecting member 47 is driven to rotate relative to the first segment 10 together with the first action wheel 46, because the connecting member 47 is fixed on the first action wheel 46. As a result, the second segment 20 rotates relative to the first segment 10 because of the rotation of the connecting member 47.

The second driving device 60 drives the second drive wheel 72 to rotate, and the second action wheel 75 is driven to rotate by the second drive wheel 72 via the second transmission belt 76. The transmission shaft 74 is driven to rotate together with the second action wheel 75, because the transmission shaft 74 is fixed on the second action wheel 75. The first bevel gear 782 is driven to rotate about the first axis 12 by the transmission shaft 74, and then drives the second bevel gear 784 to rotate about the second axis 22. As a result, the output shaft 28 rotates about the second axis 22 together with the second bevel gear 784.

The spraying tool is fixed to the output shaft 28, and the pipes extend through the guiding hole 262 and the guiding hole 7842, and are connected to the spraying tool. Therefore, when the spraying tool rotates together with the output shaft 28, the pipes are aligned with the second axis 22, thereby avoiding being wound on the second segment 20. It should be appreciated that, the spraying tool may be replaced by a detector or a welding tool, and a plurality of data lines or electric cables can be received in the guiding holes 262, 7842.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A robotic arm assembly, comprising:
a first segment; and
a second segment rotatably connected to the first segment;
a first driving device and a first transmission mechanism, the first driving device driving the second segment to rotate about a first axis relative to the first segment via the first transmission mechanism; and
a second driving device and a second transmission mechanism, the second transmission mechanism comprising a first bevel gear, a second bevel gear meshed with the first bevel gear, a second drive wheel, a transmission shaft, a second action wheel, a second transmission belt, and a restricting member, wherein the second transmission belt connects the second drive wheel to the second action wheel, the second action wheel is fixedly sleeved on the transmission shaft, and the transmission shaft is fixed to the first bevel gear, the transmission shaft forms a shaft shoulder, the first bevel gear is sleeve on the transmission shaft and resists the shaft shoulder, the restricting member is fixed to an end of the transmission shaft and resist the first bevel gear, an output shaft is fixed to the second bevel gear, and the output shaft is capable of rotating about a second axis, each of the second segment, the output shaft, and the second bevel gear defines a guiding hole, and the guiding holes are aligned in the second axis.

2. The robotic arm assembly of claim 1, wherein the second segment comprises a fixing portion extending along a direction substantially perpendicular to the first axis, and an output portion extending along a direction substantially perpendicular to the second axis, the fixing portion is fixed to the first segment, and the output shaft is fixed to the output portion.

3. The robotic arm assembly of claim 2, wherein the fixing portion defines a receiving groove opposite to the first segment, and the output portion defines a positioning groove communicating with the guiding hole thereof, the first bevel gear is received in the receiving groove of the fixing portion, and the second bevel gear is received in the positioning groove of the output portion.

4. The robotic arm assembly of claim 2, wherein the second transmission mechanism further comprises a first bearing received in the receiving groove of the fixing portion to support the first bevel gear, and a second bearing received in the positioning groove of the output portion to support the second bevel gear.

5. The robotic arm assembly of claim 1, wherein the first transmission mechanism comprises a first drive wheel, a first transmission belt, and a first action wheel; the first drive wheel is connected to the first driving device, and driven to rotate by the first driving device; the first action wheel is fixed to the second segment, and the first transmission belt sleeves on the first drive wheel and the first action wheel.

6. The robotic arm assembly of claim 5, wherein the first transmission mechanism further comprises a connecting member connecting the first action wheel to the second segment.

7. The robotic arm assembly of claim 6, wherein the first segment forms a receiving portion and a connecting portion formed on an end of the receiving portion, the first driving device, the first transmission mechanism, the second transmission mechanism, and the second driving device are received in the receiving portion; the second segment is connected to the connecting portion.

8. The robotic arm assembly of claim 1, wherein each of the first driving device and the second driving device is an electrical motor.

9. A robotic arm assembly, comprising:
a first segment;
a second segment rotatably connected to the first segment;
a first driving device driving the second segment to rotate about a first axis relative to the first segment;
a second driving device;
a first bevel gear and a second bevel gear meshed with the first bevel gear,
a second drive wheel;
a transmission shaft fixed to the first bevel gear;
a second action wheel fixedly sleeved on the transmission shaft;
a second transmission belt connecting the second drive wheel to the second action wheel; and
a restricting member;

wherein the transmission shaft forms a shaft shoulder, the first bevel gear is sleeve on the transmission shaft and resists the shaft shoulder, the restricting member is fixed to an end of the transmission shaft and resist the first bevel gear, an output shaft is fixed to the second bevel gear, each of the second segment, the output shaft, and the second bevel gear defines a guiding hole, and the guiding holes are aligned in a straight line.

10. The robotic arm assembly of claim 9, wherein the second segment comprises a fixing portion extending along a direction substantially perpendicular to a first axis and an output portion extending along a direction substantially perpendicular to the second axis, the fixing portion is fixed to the first segment, and the output shaft is fixed to the output portion.

11. The robotic arm assembly of claim 10, wherein the fixing portion defines a receiving groove opposite to the first segment, and the output portion defines a positioning groove communicating with the guiding hole thereof, the first bevel gear is received in the receiving groove of the fixing portion, and the second bevel gear is received in the positioning groove of the output portion.

12. The robotic arm assembly of claim 9, wherein each of the first driving device and the second driving device is an electrical motor.

* * * * *